United States Patent
Graham (12)

(10) Patent No.: US 6,481,996 B1
(45) Date of Patent: Nov. 19, 2002

(54) TAPERED MOLD RUNNER BLOCK

(75) Inventor: Leonard C. Graham, Cave Creek, AZ (US)

(73) Assignee: The Tech Group, Inc., Scottsdale, AZ (US)

( * ) Notice: Subject to any disclaimer, the term of this patent is extended or adjusted under 35 U.S.C. 154(b) by 0 days.

(21) Appl. No.: 09/577,392

(22) Filed: May 25, 2000

(51) Int. Cl.[7] ............................................... B29C 45/38
(52) U.S. Cl. ..................... 425/168; 264/161; 264/163; 425/553; 425/572; 425/574; 425/588; 425/DIG. 51
(58) Field of Search ................................ 425/168, 542, 425/543, 572, 573, 574, 588, DIG. 129, DIG. 221, 553, 567, 190, 192 R, DIG. 51; 264/161, 163

(56) References Cited

U.S. PATENT DOCUMENTS

| | | | | |
|---|---|---|---|---|
| 2,431,349 A | * | 11/1947 | Stacy ........................... 425/130 |
| 2,571,766 A | * | 10/1951 | Saulino ........................ 425/556 |
| 2,611,151 A | * | 9/1952 | Carter et al. ............... 425/129.1 |
| 3,776,676 A | * | 12/1973 | Kessler ........................ 425/547 |
| 4,362,291 A | * | 12/1982 | Fuke et al. .................. 249/144 |
| 4,451,224 A | * | 5/1984 | Harding ....................... 425/548 |
| 4,453,903 A | * | 6/1984 | Pukaite ....................... 425/117 |
| 4,741,507 A | * | 5/1988 | Baird ........................... 249/91 |
| 4,779,835 A | * | 10/1988 | Fukushima et al. ......... 249/161 |
| 4,818,462 A | * | 4/1989 | Murano ...................... 264/328.8 |
| 5,540,576 A | * | 7/1996 | Kawakita et al. ............. 425/73 |
| 5,750,153 A | * | 5/1998 | Shibata ........................ 425/116 |
| 5,824,252 A | * | 10/1998 | Miyajima ................... 264/272.17 |
| 5,914,136 A | * | 6/1999 | Han ............................. 425/117 |

* cited by examiner

*Primary Examiner*—Jan H. Silbaugh
*Assistant Examiner*—Emmanuel Luk
(74) *Attorney, Agent, or Firm*—LaValle D. Ptak (57) ABSTRACT

A tapered running block and corresponding tapered cavity blocks are utilized in a mold for fabricating relatively thin, flat plastic cards, such as used for pre-paid telephone cards and the like. The mating surfaces of the runner block and the cavity block are angularly tapered; so that metal-to-metal contact is made between the runner block and the cavity block when the mold is in the plastic injection position. As soon as relative movement of the runner block and the cavity block is effected to part the blocks and separate the cards from the runners, the tapered 1surfaces move away from one another without any sliding contact, thereby significantly reducing wear in the mold.

9 Claims, 6 Drawing Sheets

TAPERED MOLD RUNNER BLOCK

BACKGROUND

Injection molds are widely used to manufacture plastic parts for different applications, in different shapes. One current application is the molding of relatively thin plastic cards loaded with computer chips, ranging from relatively simple systems used in prepaid long distance phone cards, television cable box identification cards, to cards called "smart cards" including computer software for use with portable computers and the like.

These cards are molded in plastic injection molds, where the cavities of the mold plates are edge filled with plastic material. After filling, a short cooling period transpires. The mold then is opened at a parting line; and movement occurs, facilitating both card and runner ejection. The mold plates carrying the cavities used to form the cards move forward, leaving the runner block of the injection mold machine behind. The runner block is anchored to a fixed mold plate. The action of movement of the mold plates separates the cards from the runners, allowing the runners and cards to be ejected or removed from the mold separately.

The existing design of cold runner plastic injection molds for producing thin, flat computer chip-loaded cards is subject to several shortcomings. The steel components of the cavity blocks on the mold plates and the runner block typically are designed with parallel surfaces, which are perpendicular to the plane of the cards being molded. This results in rubbing (wearing) where the cavity blocks and the runner blocks slide on one another during the opening and closing operation of the mold. This results in wear of one or both of these components, in time. When this wear becomes excessive adjacent the edge of the card being molded, unwanted flash appears on the edge of the card; and production must be stopped in order to repair the mold. It is inherent that this straight design of rubbing steel parts results in steel wear, which requires relatively frequent maintenance. This situation has been tolerated and accepted in conjunction with such molds, even though it results in a significant amount of down time of the mold when parts are repaired or replaced.

Another disadvantage of prior art molds of the type described above, when the runner blocks and the cavity blocks have mating, sliding, parallel surfaces, is that both parts must be manufactured initially with some operating or running clearance. This clearance must be enough to allow the two components to move freely (that is, with a minimal amount of rubbing friction), but not so much as to cause the clearance to be excessive and cause resulting flash on the parts being manufactured. In effect, the running clearance shortens the amount of time that the mold can be run without flash occurring, since such a straight parallel design requires a small amount of wear to be built into the parts at the outset. This built-in clearance necessarily shortens the amount of time the mold can be run before maintenance is required. At the same time, without the initial built-in clearance, excessive wear and stress on the various parts of the mold would occur.

Another disadvantage of prior art molds for manufacturing thin flat, edge filled plastic cards is that the plastic being forced through the gates under high pressure and speed causes the metal in the immediate gate exit to flare out into the edge of the card, where the cutting action occurs to separate the card from the gate. Since the cavity passes by this area, the gate flaring metal begins to wear a corresponding notch in the cavity block, allowing unwanted plastic to flow in the notch. This forms a blemish on the edge of the card formed by the mold. This blemish in turn must be repaired. This occurs when the edge of the card corresponds with the cutting surface of the gate; so that wear in this area results in maintenance being required on the cavity block, as well as on the runner block of the mold.

The above noted disadvantages, inherent in standard or conventional molds for fabricating flat plastic cards with embedded computer chips, cause a significant amount of down time in the use of such molds, as a result of the relatively frequent maintenance intervals which are required in order to repair or replace the various mold parts, including the runner blocks and the cavity blocks. This resultant down time causes increased costs of the cards produced over what would otherwise be possible if the molds could be continuously run with significantly less down time.

It is desirable to provide a design for a plastic injection mold used to fabricate thin, flat plastic card components which overcomes the disadvantages of the prior art noted above, and which eliminates or significantly reduces the sliding metal-to-metal contact between the mold blocks and the runner block of the mold.

SUMMARY OF THE INVENTION

It is an object of this invention to provide an improved injection mold design.

It is another object of this invention to provide an improved injection mold design for the manufacture of edge gated cards, with reduced wear on the various mold components.

It is an additional object of this invention to provide an improved edge gated mold design which substantially eliminates rubbing friction between the runner block for the mold and the cavity blocks.

It is a further object of this invention to provide an improved mold design for producing edge gated cards which uses a tapered runner block and tapered surfaces on the cavity blocks to allow metal-to-metal contact during the plastic injection cycle of operation and to permit parting of the various mold parts without sliding metal-to-metal friction to discharge parts from the mold.

In accordance with a preferred embodiment of the invention, a plastic injection mold includes a runner block on a fixed base, with a tapered surface on it. A cavity block is movable relative to the runner block, and has a tapered surface on it for mating with and contacting the tapered surface of the runner block when the cavity block and the runner block are in a plastic injection position. The tapered surfaces of the runner block and the cavity block are designed such that upon relative movement of the cavity block and the runner block, to separate the cavity block from the runner block, the tapered surfaces move away from one another without sliding contact.

DETAILED DESCRIPTION

Reference now should be made to the drawings, in which the same reference numbers are used throughout the different figures to designate the same or similar components. Different ones of the drawings show different aspects of the invention in various orientations, and in differing detail.

Figure 1:
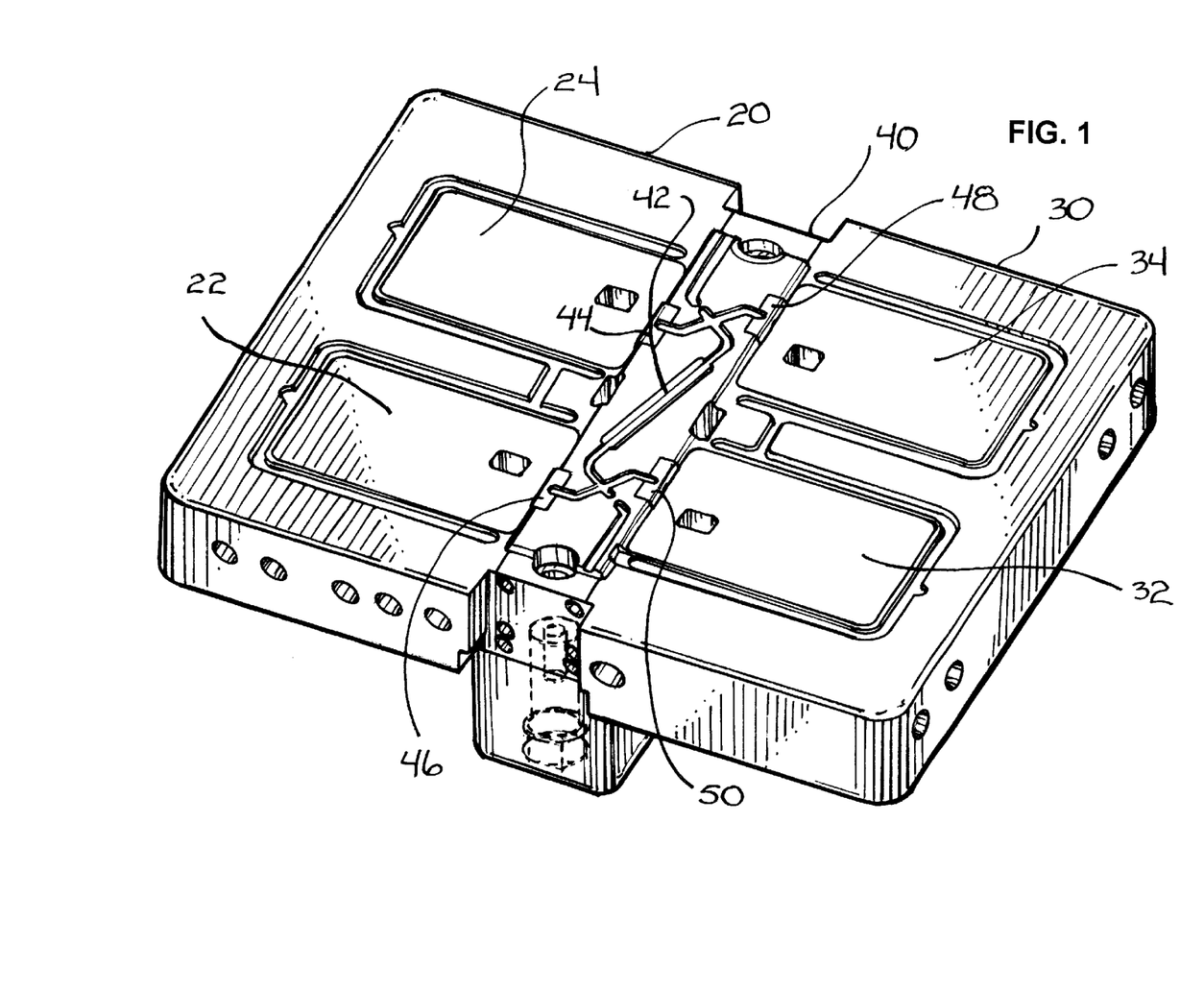
FIG. 1 is a top front right perspective view of a preferred embodiment of the invention.
Figure 2:
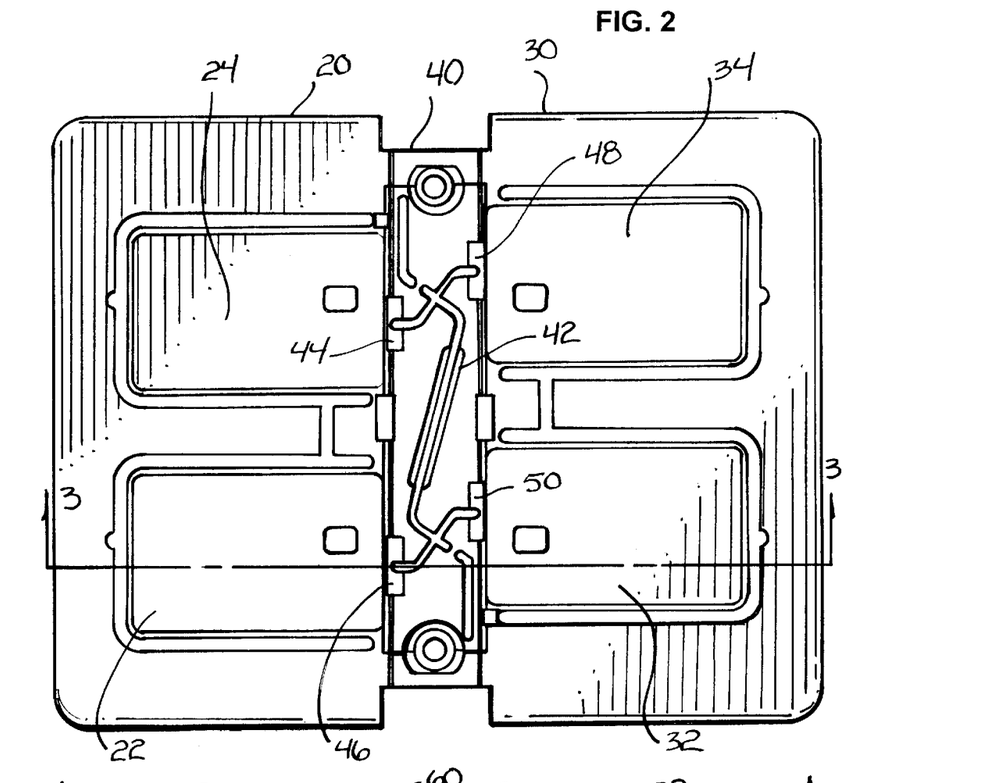
FIG. 2 is a top view of the embodiment shown in FIG. 1.

FIG. 1 is a top perspective view of those portions of a cold runner plastic injection mold which have been modified in accordance with a preferred embodiment of the invention. The mold machinery itself, which is used to move cavity blocks or mold plates relative to a runner block, are not shown in the various drawings, since such parts are standard parts; and they are not a feature of the present invention. The present invention may be employed as a substitute for straight-sided cold runner (or hot runner) plastic injection molds using edge gating. In such molds a central or fixed runner block is employed; and the cavity blocks are moved relative to the runner block in order to cut or shear the runner at the gate from the edge of the card, and to allow the cards to be removed or ejected from the mold. Only the bottom half of the cavity blocks associated with the "top" of a runner block are shown in the drawings, since the top closure for the runner blocks and the top of the cavity blocks are standard in design, and are not important to an understanding of this invention.

As shown in FIG. 1, a central tapered runner block 40 is placed between a pair of movable cavity blocks 20 and 30 which form the blocks for one side (or the lower side) of cards to be formed in four cavities 22, 24, 32, and 34, respectively. The runner block 40 has an elongated channel 42 formed in its upper surface, which has arms extending from it to supply plastic to four tapered inserts 44, 46, 48 and 50 associated with the cavities 24, 22, 34 and 32, respectively. The inserts 44, 46, 48 and 50 include corresponding gates in them at the edges of each of the cavities 22, 24, 32 and 34 for supplying plastic under high pressure to the cavities in the formation of relatively thin, flat, rectangular plastic cards, for example, of the type which subsequently have computer chips embedded in them. All of the runner block inserts 44, 46, 48 and 50 are identical; so that the details of only one of them, insert 46, are shown in detail in FIGS. 7, 8, 9, 10 and 11. In these figures, it is apparent that the plastic flow channel 42 terminates in a segment 42A at the top of each of the inserts 44, 46, 48 and 50, and from the segment 42A extends through a gate 58 located in a position at the edge of each of the cavities 22, 24, 32 and 34 in the cavity blocks 20 and 30. The details of the structure leading from the channel 42 through the segment 42A and ultimately to the gate 58 are illustrated in FIGS. 8, 9, 10 and 11.

Figure 11:
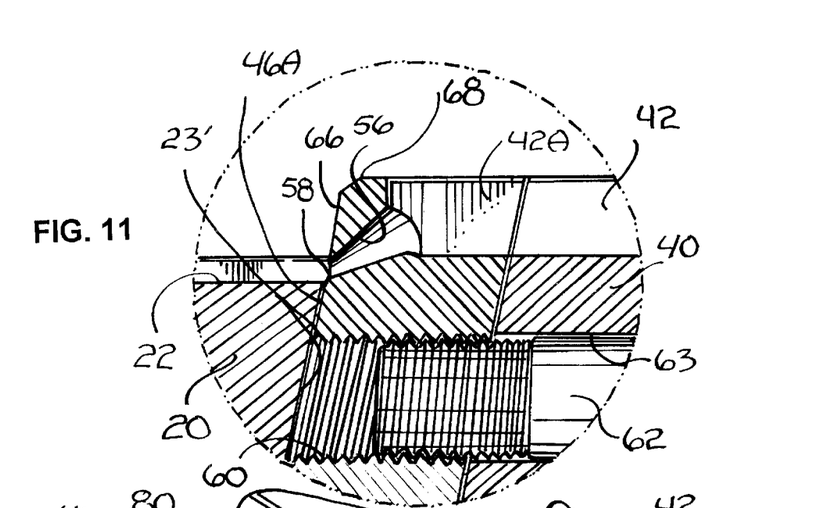
FIG. 11 is an enlarged cross section of the portion circled "11" in FIG. 3.

FIG. 11 is a cross section which illustrates the interconnection between the gate 58 and the channel portion 42A by way of a tunnel or channel 56. The manner in which plastic is injected through the gates 58 and the particular construction of the channels 42, segment 42A, and 56, is standard. Various other channel configurations may be employed to supply plastic to gates, such as the gate 58, if desired. The particular configuration which is illustrated is merely representative of conventional techniques for supplying injection molded plastic to a cavity.

As is most readily apparent from an examination of FIGS. 3, 4, 6, and 7 through 11, the runner block 40 has the upper portion, which is in contact with the cavity blocks 20 and 30, formed with tapered sides, rather than straight or vertical sides. Thus, the front surfaces 44A, 46A, 48A and 50A, respectively, of each of the inserts 44, 46, 48 and 50 are tapered upwardly (as viewed in the drawings) at. a small angle, typically greater than 8°, which will avoid application of an undesirable locking angle. The surfaces 44A, 46A, 48A and 50A all are flat surfaces, and are tapered in the same amount; so that the structure of the runner block 40 is symmetrical, as is most apparent from an examination of the top view in FIG. 4.

In addition to the inwardly tapered faces 44A, 46A, 48A and 50A, the sides of the inserts 44, 46, 48 and 50 also taper toward one another, as shown for the insert 46 as the tapered sides 70 and 72. In addition, the other surfaces of the runner block 40 which engage corresponding mating surfaces of the cavity blocks 20 and 30, also all are tapered; so that no surfaces perpendicular to the top plane of the mold assembly shown in FIG. 1, are in contact between the runner block 40 and the cavity blocks 20 and 30. This is readily apparent from an examination of the various drawings, and is most particularly shown in FIGS. 3, 6, and 11.

In the mold blocks 20 and 30 (which are identical, but mirror images of one another), upwardly and outwardly tapered surfaces, such as the surfaces 31 and 35, abut adjacent tapered surfaces on the runner block 40. Similarly, outwardly tapered surfaces, such as the surface 23 which abuts the face 46A of the insert 46, abut each of the inserts 44, 46, 48 and 50 in the manner illustrated in FIGS. 3 and 11 most particularly.

When the mold is in the injection molding position, the various tapered surfaces on the runner block 40 and the cavity blocks 20 and 30 all make a firm metal to metal contact, which has not been possible with the straight edged mold designs of the past, since these designs required a built-in clearance. No clearance is required in the mold design which is illustrated in the various figures of the drawing. Since no clearances are required, accurate centering of the runner block between the movable cavity blocks 20 and 30 is afforded by the design shown in the various figures of the drawing. This allows for consistent mold cavity venting, which has been a problem with the devices of the prior art.

Figure 3:
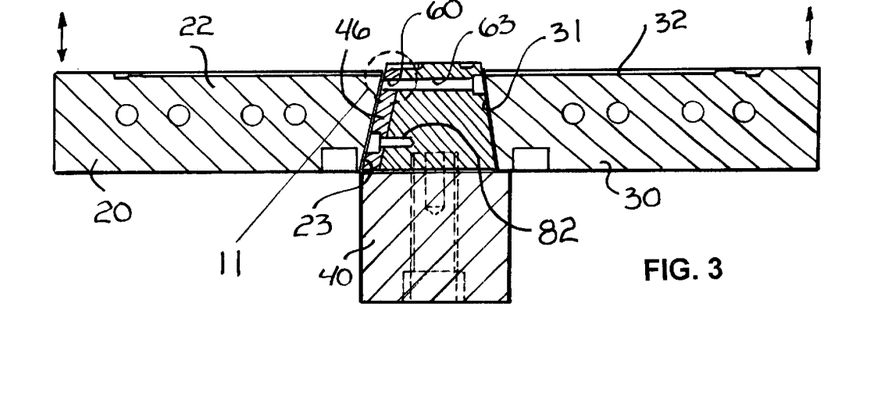
FIG. 3 is a cross-sectional view taken along the line 3—3 of FIG. 2.
Figure 4:
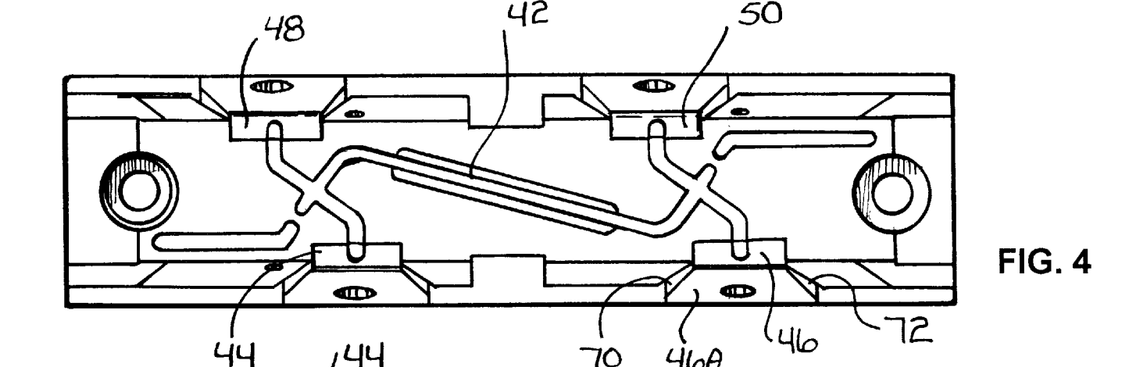
FIG. 4 is a top view of a portion of the embodiment shown in FIG. 1.
Figure 5:
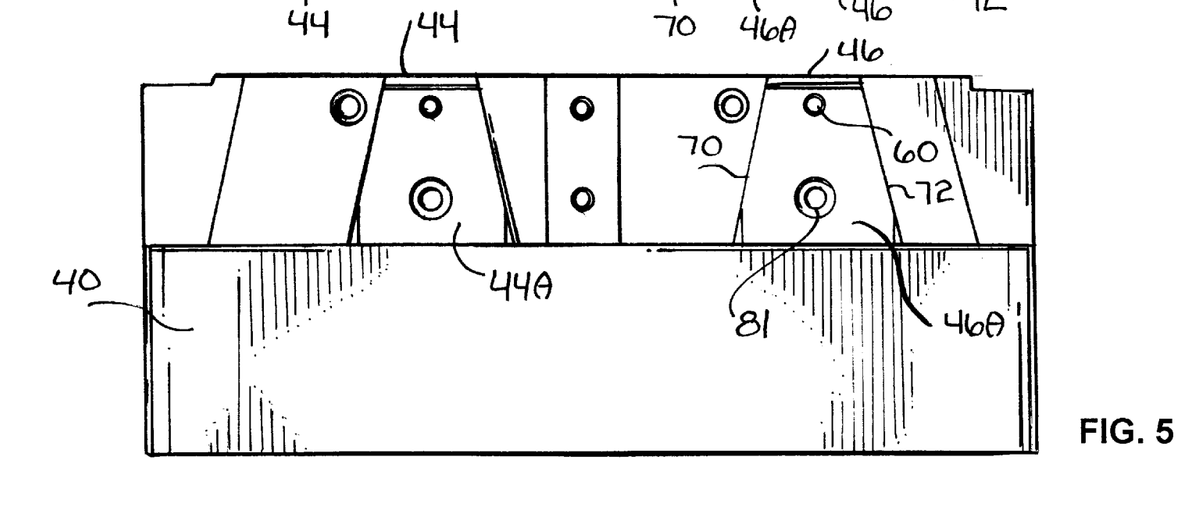
FIG. 5 is a side view of the portion shown in FIG. 4.
Figure 6:
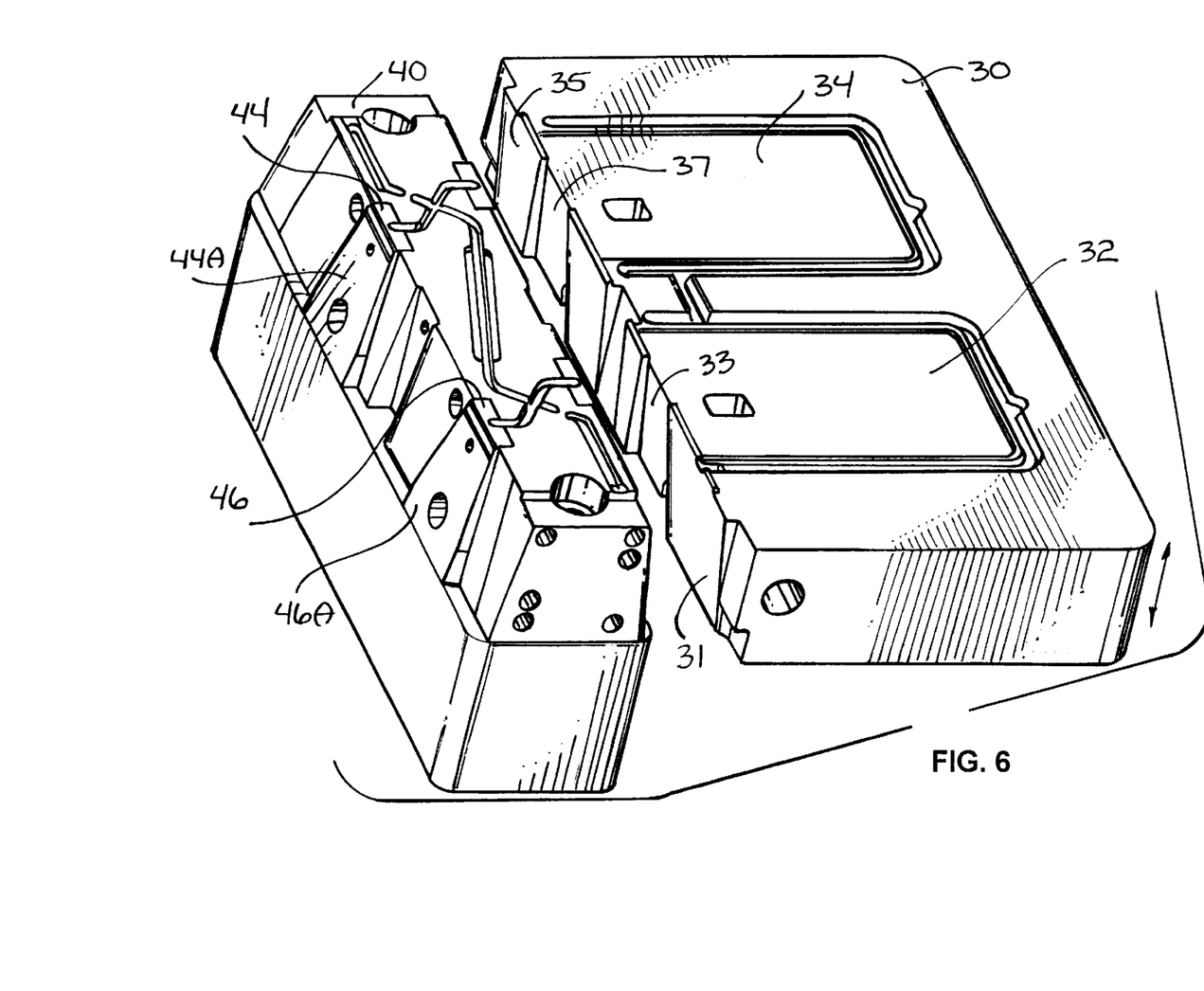
FIG. 6 is a left front top perspective view of a portion of the embodiment shown in FIG. 1, in exploded form.

When the cavity blocks 20 and 30 are separated from the runner block, they move vertically in the direction shown in FIG. 3 relative to the runner block 40 which remains in a fixed position. It is readily apparent from an examination of FIG. 3 that vertical movement of the cavity blocks 20 and 30, immediately when it begins to take place, causes a non-frictional pulling away of the runner block 40 and the cavity blocks 20 and 30. No frictional sliding of any of the surfaces (all of the mating surfaces are tapered) to part the runner block 40 from the cavity blocks 20 and 30 takes place.

Figures 7, 8, 9:
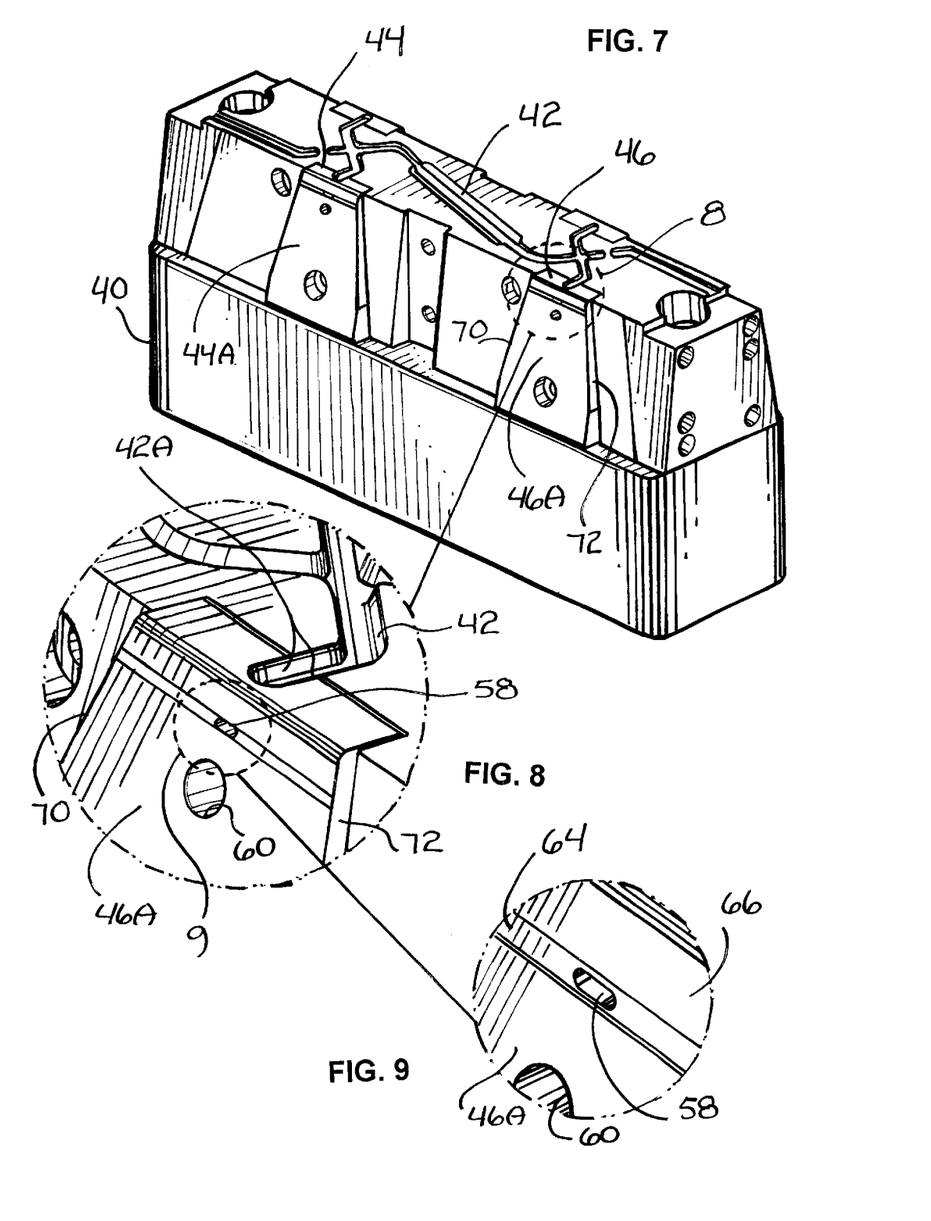
FIG. 7 is a left front top perspective view of a portion of the embodiment shown in FIG. 6.
FIG. 8 is an enlarged detail of the portion circled as "8" in FIG. 7.
FIG. 9 is an enlarged detail of the portion encircled as "9" in FIG. 8.

In addition, as is most readily apparent from an examination of the enlarged insert of FIG. 11, the card which is formed in the cavity block, such as the cavity block 22, is severed from the gate 58 as the cavity block 20 moves upwardly (as viewed in FIG. 11), without any metal-to-metal contact at the gate 58. The card is sheared from the runner at the upper edge of the gate 58 on the insert 46. The surface 66 above the edge of the gate 58 is set back from the surface 46A below the gate 58 (most clearly shown in. FIG. 11), and has an approximate 10° taper angle, which is slightly less than the 12° taper of the surface 46A comprising the major face of the insert block 46. The edge 64 on the insert 46, shown most clearly in FIGS. 8, 9 and 10, is a straight or vertical edge forming the edge of the card formed in the cavity blocks 22, 24, 32 and 36; but there is no metal-to-metal contact in this region, since the edge 64 comprises the closure for the end of the cavity into which the plastic is injected through the gate 58.

Another important feature inherent in the design described above is that the upper or shearing edge of the gate 58 is set back slightly from the shut-off angle at the lower edge, formed at the upper edge of the surface 46A creating the protective setback 64A. This is shown most clearly in FIG. 11. Consequently, when the relative movement of the runner block 40 and the cavity block 20 occurs to move the cavity block upward, as viewed in FIG. 11 with respect to the runner block 40, the edge 23 of the cavity-block is spaced a short distance from the upper cutting edge of the gate 58. Thus, even if some gate flaring occurs as a result of the high pressure and speed of plastic flow through the gate 58, a gap occurs between the lower edge of the surface 66 and the upper edge of the surface 23. As a result, the problem of wear, in the form of cavity damaging notches in the cavity block 20 which occurred with the molds of the prior art and caused cosmetic imperfections on the edge of the card, does not take place. The only cutting action at the upper edge of the gate 58 occurs in the plastic on the edge of the card and runner in the channel 56, at the end of the flow channel extension 42A.

Since the surface 46A (and the corresponding surfaces 44A, 48A and 50A) all extend outwardly from the upper edges of the runner block 40, as shown in FIGS. 4, 5, 6 and 7, corresponding sloped or tapered surfaces (not numbered but shown in FIG. 6) on the cavity blocks 20 and 30 mate with these surfaces; so that, again, as the cavity blocks are moved upwardly, as viewed in the drawings, there is an immediate pulling away of all of the metal-to-metal tapered contacting surfaces in the cavity blocks 20 and 30 with the surfaces on the runner block 40.

Figure 10:
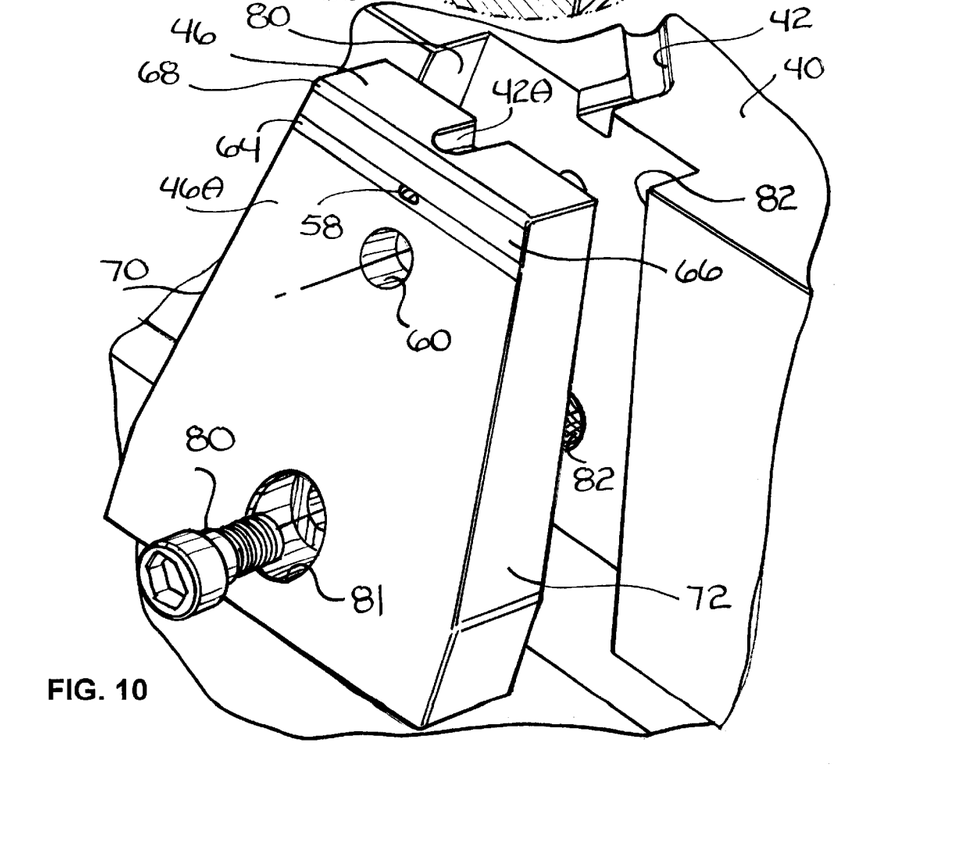
FIG. 10 is an enlarged exploded detail of a portion of the preferred embodiment of the invention.

FIGS. 3, 10 and 11 illustrate details of the attachment of removable inserts 44, 46, 48 and 50 in the runner block 40. These inserts are the only parts of the runner block which may need replacement as a result of wear, primarily at the gate 58. As a consequence, they are held in place by means of a bolt or threaded fastener 80 passing through a hole 81 at the lower portion. These fasteners then are threaded into receiving threaded holes 82 in the runner block 40. Another bolt or threaded fastener 62 is passed through the runner block 40 from the opposite side, and is secured into a threaded hole 60 near the upper part of the blocks 44, 46, 48 and 50, as illustrated in detail in FIGS. 3 and 11. Thus, whenever replacement of any one or more of the blocks 44, 46, 48 and 50 is desired, it can be effected rapidly by the removal of the bolts 62 and 80 followed by replacement of a new insert and tightening again of the bolts 62 and 80.

The foregoing description of the preferred embodiment of the invention is to be considered as illustrative and not as limiting. Variations in the. angles and shapes readily may be made without departing from the invention. Various other changes and modifications will occur to those skilled in the art for performing substantially the same function, in substantially the same way, to achieve substantially the same result, without departing from the true scope of the invention as defined in the appended claims.

What is claimed is:

1. An improvement in a plastic injection mold comprising a cavity block having at least one cavity therein for forming relatively thin flat cards in a first plane, and a runner block with at least one plastic flow channel therein to supply plastic to the edge of the cavity in the cavity block when the runner block and the cavity block are in the plastic injection position, the improvement including in combination:

a runner block having a tapered surface thereon;

a cavity block movable relative to the runner block, and having a tapered surface thereon for mating with and contacting the tapered surface of the runner block when the cavity block and the runner block are in a plastic injection position in the first plane; and the tapered surfaces on the runner block and the cavity block being designed such that upon movement of one or the other of the cavity block and the runner block to a different plane parallel to the first plane to separate the cavity block from the runner block, the tapered surfaces move away from one another without sliding contact to sever runners from the cards without flash.

2. The improvement in a plastic injection mold according to claim 1 wherein the runner block and the cavity block each have multiple tapered surfaces thereon for mating and contacting corresponding surfaces of the runner block and the cavity block when the cavity block and the runner block are in a plastic injection position.

3. An improvement in a plastic injection mold according to claim 1 wherein the runner block has a base surface and a flow channel surface spaced a predetermined distance from the base surface, with at least one tapered side surface thereon, with the tapered side surface tapering inwardly at a predetermined angle from a plane perpendicular to the planes of the flow channel surface of the runner block, wherein the mating tapered surface on the cavity block extends outwardly at said predetermined angle from the cavity block.

4. An improvement in a plastic injection mold according to claims 3 further including additional mating tapered surfaces on the runner block and the cavity block perpendicular to at least one tapered side surface in the region where the gate of the runner block opens into the cavity on the cavity block.

5. An improvement in a plastic injection mold according to claim 4 wherein all of the tapered surfaces on the runner block and the cavity block. are designed to contact one another with the runner block and the cavity block in a plastic injection position, and further are designed such that upon relative movement of the cavity block and the runner block away from one another, the tapered surfaces move away from one another without sliding contact.

6. The improvement in a plastic injection mold according to claim 1 wherein the runner block and the cavity block each have multiple tapered surfaces thereon for mating and contacting corresponding surfaces of the runner block and the cavity block when the cavity block and the runner block are in a plastic injection position.

7. An improvement in a plastic injection mold according to claim 1 further including additional mating tapered surfaces on the runner block and the cavity block perpendicular to at least one tapered side surface in the region where the gate of the runner block opens into the cavity on the cavity block.

8. An improvement in a plastic injection mold according to claim 7 wherein all of the tapered surfaces on the runner block and the cavity block are designed to contact one another with the runner block and the cavity block in a plastic injection position, and further are designed such that upon relative movement of the cavity block and the runner block away from one another, the tapered surfaces move away from one, another without sliding contact.

9. An improvement in a plastic injection mold according to claim 1 wherein the runner block has a base surface and a flow channel surface spaced a predetermined distance from the base surfaced, with at least one tapered side surface thereon tapering inwardly at a predetermined angle from a plane perpendicular to the planes of the flow channel surface of the runner block, wherein the mating tapered surface on the cavity block extends outwardly at said predetermined angle from the cavity block.

* * * * *